United States Patent
Scharp et al.

(10) Patent No.: US 8,267,005 B2
(45) Date of Patent: Sep. 18, 2012

(54) MULTI-PART PISTON FOR AN INTERNAL COMBUSTION ENGINE AND METHOD FOR ITS PRODUCTION

(75) Inventors: Rainer Scharp, Vaihingen (DE); Klaus Keller, Lorch (DE); Volker Weisse, Stuttgart (DE)

(73) Assignee: MAHLE International GmbH, Stuttgart (DE)

( * ) Notice: Subject to any disclaimer, the term of this patent is extended or adjusted under 35 U.S.C. 154(b) by 855 days.

(21) Appl. No.: 12/381,840

(22) Filed: Mar. 17, 2009

(65) Prior Publication Data
US 2010/0107868 A1    May 6, 2010

(30) Foreign Application Priority Data
Nov. 5, 2008    (DE) .......................... 10 2008 055 911

(51) Int. Cl.
F02F 3/22    (2006.01)
F02F 3/00    (2006.01)
(52) U.S. Cl. ............................... 92/186; 92/231; 92/256
(58) Field of Classification Search ............ 92/186, 92/216, 231, 255, 256; 123/41.35
See application file for complete search history.

(56) References Cited

U.S. PATENT DOCUMENTS

| | | | | |
|---|---|---|---|---|
| 4,581,983 A * | 4/1986 | Moebus | ........................ | 92/186 |
| 5,052,280 A * | 10/1991 | Kopf et al. | .................... | 92/186 |
| 5,144,923 A * | 9/1992 | Leites et al. | .................... | 92/186 |
| 6,026,777 A * | 2/2000 | Kemnitz et al. | ............ | 123/193.6 |
| 6,453,797 B1 * | 9/2002 | Bauer | ............................ | 92/186 |
| 6,840,155 B2 * | 1/2005 | Ribeiro et al. | .................. | 92/186 |

FOREIGN PATENT DOCUMENTS

| | | | |
|---|---|---|---|
| DE | 1949581 A * | 4/1971 | |
| EP | 1 222 364 | 7/2002 | |

* cited by examiner

*Primary Examiner* — Thomas E Lazo
(74) *Attorney, Agent, or Firm* — Collard & Roe, P.C.

(57) ABSTRACT

The present invention relates to a multi-part piston (10) for an internal combustion engine, having an upper piston part (11) having a piston crown (13), and a lower piston part (12), whereby the lower piston part (12) has pin boss supports (32) and pin bosses (18) connected with them, whereby the upper piston part (11) and the lower piston part (12) each have an inner (21, 25) and an outer (22, 26) support element, which elements delimit an outer circumferential cooling channel (29). According to the invention, it is provided that the inner support elements (21, 25) delimit a cavity (31) that is open toward the pin bosses (18), and that the cavity (31) is provided with a separate cooling oil collector (35) that has at least one cooling oil opening (37, 38).

15 Claims, 2 Drawing Sheets

MULTI-PART PISTON FOR AN INTERNAL COMBUSTION ENGINE AND METHOD FOR ITS PRODUCTION

CROSS REFERENCE TO RELATED APPLICATIONS

Applicant claims priority under 35 U.S.C. §119 of German Application No. 10 2008 055 911.3 filed on Nov. 5, 2008.

BACKGROUND OF THE INVENTION

1. Field of the Invention

The present invention relates to a multi-part piston for an internal combustion engine, having an upper piston part that has a piston crown, and a lower piston part, whereby the lower piston part has pin boss supports and pin bosses connected with them, and whereby the upper piston part and the lower piston part each have an inner and an outer support element, which elements delimit an outer circumferential cooling channel. The present invention furthermore relates to a method for the production of such a piston.

2. The Prior Art

A multi-part piston is disclosed, for example, in EP 1 222 364 B1. This piston has an outer circumferential cooling channel and an inner cooling chamber whose cooling chamber bottom is provided with an opening. This opening serves to allow cooling oil to flow away out of the inner cooling chamber in the direction of the piston crown, in order to lubricate the piston pin and to intensify the cooling effect by means of effective cooling oil circulation. In order to achieve this goal, the opening in the cooling chamber bottom is not allowed to be chosen to be too large, because then, the cooling oil would no longer flow away in metered manner, and effective cooling oil circulation would thereby be impaired. This means that the cooling chamber bottom is configured essentially as a relatively wide and thin circumferential ring land that extends approximately in the radial direction, in the upper region of the lower piston part. However, such a structure is difficult to produce. In the case of a forged lower piston part, in particular, there is the additional problem that when using a forging method, only a very thick and heavy cooling chamber bottom can be produced, due to forging tolerances and production restrictions.

SUMMARY OF THE INVENTION

The task of the present invention consists in making available a multi-part piston as well as a method for its production, which guarantees a good cooling effect of the cooling oil as well as effective lubrication of the piston pin, and, at the same time, is as simple as possible to produce as a light piston, also in the form of a forged piston.

The solution consists in a piston wherein the inner support elements of the piston delimit a cavity that is open toward the pin bosses, and wherein the cavity is provided with a separate cooling oil collector that has at least one cooling oil opening. The method for the production of a multi-part piston for an internal combustion engine according to the invention is characterized by the following method steps: producing an upper piston part having a piston crown as well as an inner and an outer support element; producing a lower piston part having pin boss supports and pin bosses connected with them, as well as having an inner and an outer support element; inserting a separate cooling oil collector, having at least one cooling oil opening, into the upper piston part or the lower piston part; connecting the upper piston part and the lower piston part in such a manner that the inner and outer support elements, in each instance, delimit an outer circumferential cooling channel and a cavity that is open toward the pin bosses and provided with the cooling oil collector.

According to the invention, an inner cooling chamber and thus a cooling chamber bottom in the piston are therefore eliminated. The problem of producing a circumferential ring land that extends approximately in the radial direction, as a relatively wide and thin region, is therefore completely eliminated. The upper piston part and the lower piston part of the piston according to the invention can therefore also be produced as forged parts, in relatively simple manner, and as comparatively light components. The piston according to the invention and the production method according to the invention are thus also characterized by clearly improved economic efficiency. In this connection, the cooling oil collector serves to optimize the cooling effect of the cooling oil, particularly below the piston crown. The at least one cooling oil opening in the cooling oil collector provided according to the invention also allows significantly better and more precise metering of the cooling oil that flows away in the direction of the piston pin, so that the lubrication of the piston pin is also improved, as compared with the pistons known in the state of the art. Since the cooling oil collector can be produced and installed as a very simply structured and light component, the economic efficiency of the piston according to the invention, and of the production method according to the invention, remains unimpaired.

Advantageous further developments are evident from the dependent claims.

A preferred embodiment of the piston according to the invention consists in that the cooling oil collector is held on the inner support element of the upper piston part or on the inner support element of the lower piston part. Positioning of the cooling oil collector in the cavity can therefore be selected as desired, and can take place both above and below the joining surfaces of the support elements, depending on the requirements of the individual case.

Another advantageous embodiment of the piston according to the invention provides that a concave, at least partially circumferential depression for accommodating at least one edge region of the cooling oil collector is provided on the inner support element of the upper piston part and/or on the inner support element of the lower piston part. In this way, the cooling oil collector is given a defined and additionally secured position within the cavity.

It is practical if the cooling oil collector is held under spring bias. In this case, in particular, the cooling oil collector can be configured as an at least partially spring-elastic component. A possible configuration of such a cooling oil collector consists in that the cooling oil collector has an at least partially circumferential spring-elastic flange or at least two elastic spring tongues disposed on the outer edge. In the latter case, the slits that delimit the spring tongues can serve as cooling oil openings at the same time. In the case that a concave, at least partially circumferential depression or convex elevation is provided, the flange or the spring tongues, respectively, should be shaped to correspond to this depression or elevation, so that they can be accommodated, i.e. supported in it.

In the simplest case, the cooling oil collector has an essentially round shape and can be provided with a slight curvature.

The at least one cooling oil opening in the cooling oil collector can be configured as a usual, round opening, or, for example, also as a slit that is disposed at the edge of the cooling oil collector or extends inward from the edge of the cooling oil collector. Preferably, the cooling oil collector has two or more cooling oil openings, so that a very precisely metered amount of cooling oil can flow away out of the cavity in the direction of the piston pin.

The cooling oil collector can be produced from any desired material, whereby spring steel sheet has been proven to be well suited.

The upper piston part and/or the lower piston part can be cast parts or forged parts, and can be produced, for example, from a steel material, particularly forged. The connection between upper piston part and lower piston part can take place in any desired manner. Welding, particularly friction welding, is possible as a particularly well suited joining method.

BRIEF DESCRIPTION OF THE DRAWINGS

Other benefits and features of the present invention will become apparent from the following detailed description considered in connection with the accompanying drawings. It is to be understood, however, that the drawings are designed as an illustration only and not as a definition of the limits of the invention.

In the drawings, similar reference characters denote similar elements throughout the several views.

Figure 1:
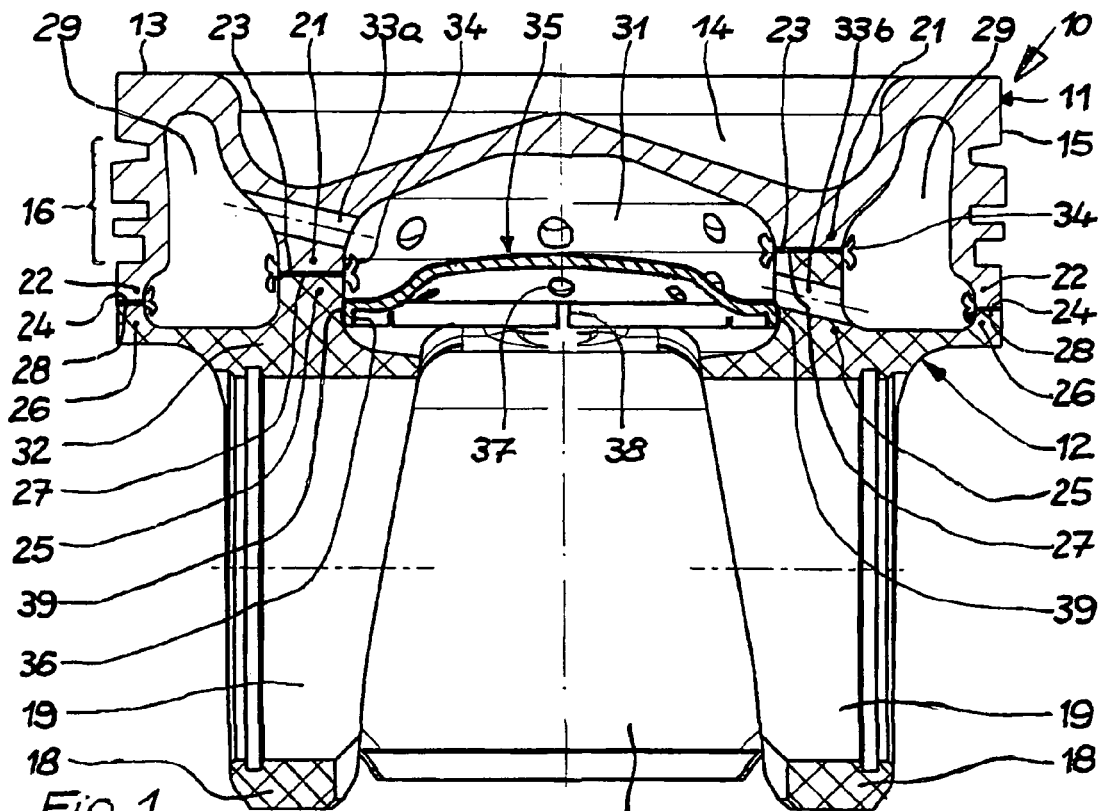
Figure 2:
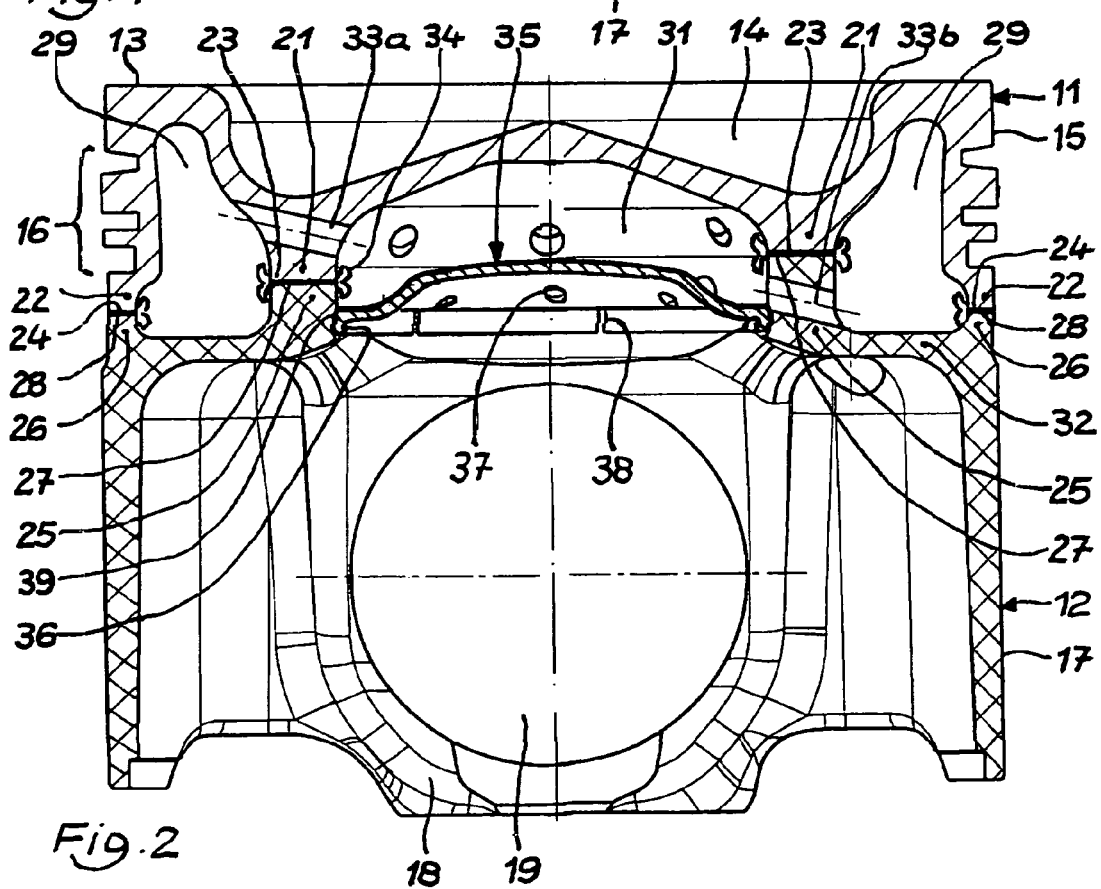
Figure 3:
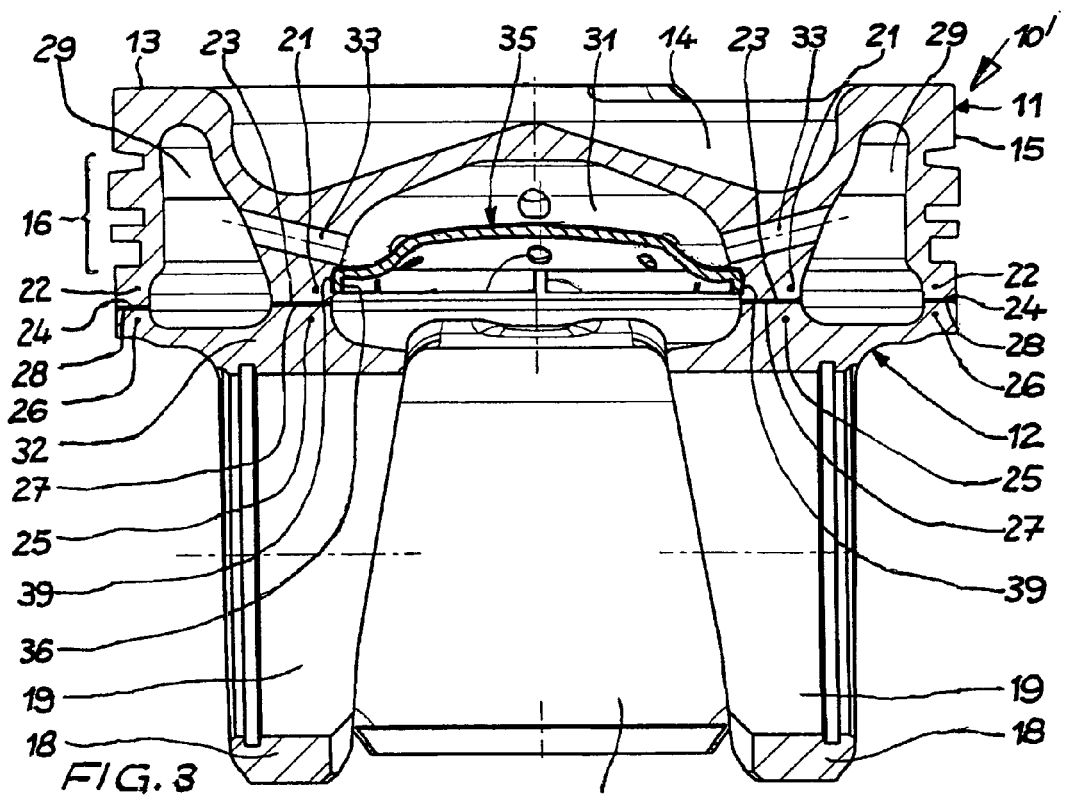
Figure 4:
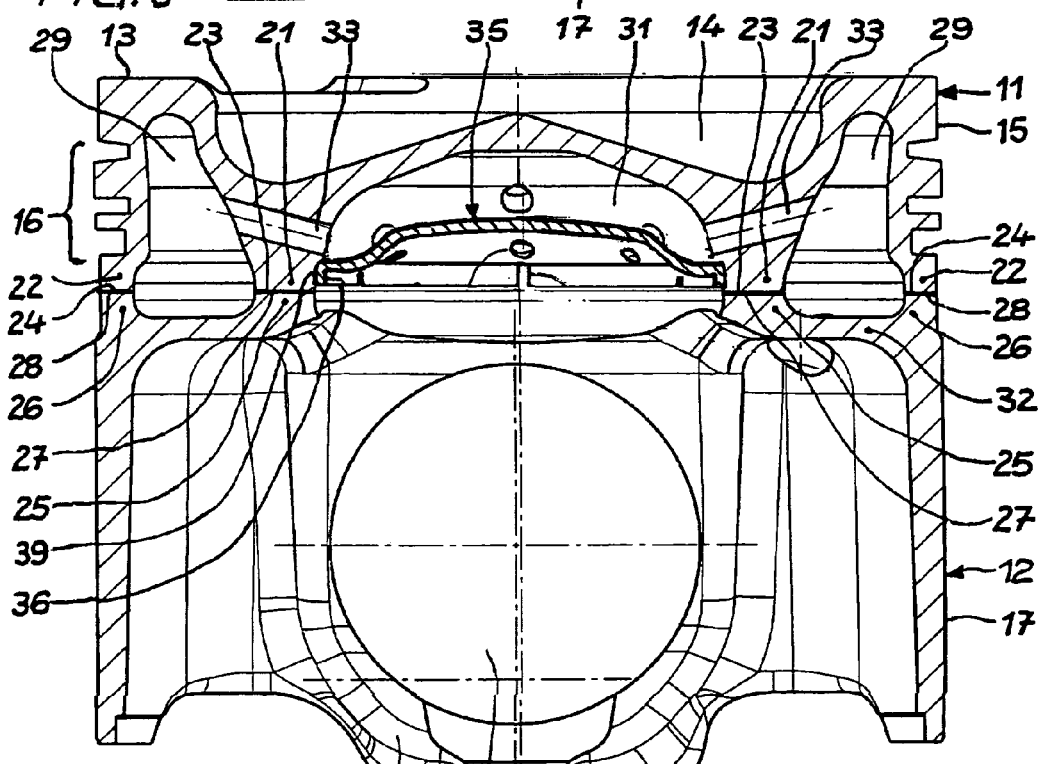

An exemplary embodiment of the present invention will be explained in greater detail below, using the attached drawings. These show, in a schematic representation, not to scale:

FIG. 1 a section through an exemplary embodiment of a piston according to the invention;

FIG. 2 the piston according to FIG. 1 in section, whereby the representation is rotated by 90° as compared with FIG. 1, FIG. 3 a section through another exemplary embodiment of a piston according to the invention;

FIG. 4 the piston according to FIG. 3 in section, whereby the representation is rotated by 90° as compared with FIG. 3.

DETAILED DESCRIPTION OF THE DRAWINGS

FIGS. 1 and 2 show an exemplary embodiment of a piston 10 according to the invention. The piston 10 according to the invention is composed of an upper piston part 11 and a lower piston part 12, which, in the exemplary embodiment, are forged from a steel material. The upper piston part 11 has a piston crown 13 having a combustion bowl 14, as well as a circumferential top land 15 and a circumferential ring belt 16.

The lower piston part 12 has a piston skirt 17 and pin bosses 18 having pin bores 19, for accommodating a piston pin (not shown).

The upper piston part 11 has an inner support element 21 and an outer support element 22. The inner support element 21 is disposed on the underside of the piston crown 13, circumferentially, in ring shape, and has a joining surface 23. The outer support element 22 of the upper piston part 11 is formed below the ring belt 16, in the exemplary embodiment, and has a joining surface 24.

The lower piston part 12 also has an inner support element 25 and an outer support element 26. The inner support element 25 is disposed on the top of the lower piston part 12, circumferentially, and has a joining surface 27. The outer support element 26 is formed as an extension of the piston skirt 17 in the exemplary embodiment, and has a joining surface 28. Pin boss supports 32 for connecting the pin bosses 18 are provided below the inner support element 25 of the lower piston part 12.

The upper piston part 11 and the lower piston part 12 can be joined together in any desired manner, whereby the joining surfaces 23 and 27, and 24 and 28, respectively, are connected with one another. In the exemplary embodiment, the known friction welding method was selected, as can be seen by the friction welding beads 24 in the figures.

The upper piston part 11 and the lower piston part 12 form an outer circumferential cooling channel 29. In this connection, the ring belt 16 and the outer support element 22 of the upper piston part 11 as well as the outer support element 26 of the lower piston part 12 delimit the outer cooling channel 29 toward the outside. The inner support element 21 of the upper piston part 11 and the inner support element 25 of the lower piston part 12 delimit the outer cooling channel 29 toward the piston interior. The inner support element 21 of the upper piston part 11 and the inner support element 25 of the lower piston part 12 furthermore delimit a cavity 31 that is open toward the pin bosses 18, which cavity is disposed essentially below the piston crown 13.

In the exemplary embodiment, cooling oil channels 33a are provided in the inner support element 21 of the upper piston part 11, and cooling oil channels 33b are provided in the inner support element 25 of the lower piston part 12, which channels connect the outer cooling channel 29 with the cavity 31. In the exemplary embodiment, the cooling oil channels 33a run at an angle, downward, proceeding from the outer cooling channel 29, in the direction of the cavity 31. In the exemplary embodiment, the cooling oil channels 33b run at an angle, upward, proceeding from the outer cooling channel 29, in the direction of the cavity 31. From the figures, it is also evident that depending on the arrangement of the cooling oil channels 33a, 33b, the joining surfaces 23, 17 and 24, 28, respectively, which are assigned to one another, do not have to lie in one plane. Of course, the cooling oil channels can also be disposed exclusively in the inner support element 21 of the upper piston part 11 or exclusively in the inner support element 25 of the lower piston part 12.

The cavity 31 is provided with a cooling oil collector 35. In the exemplary embodiment, the cooling oil collector 35 is produced from a spring steel sheet, has an essentially round shape, is provided with a slight curvature, and has a thickness of approximately 0.8 mm. In the exemplary embodiment, it has a circumferential spring-elastic flange 36 and cooling oil openings 37. In the exemplary embodiment, the flange 36 is provided with slits 38 that both increase the elasticity of the flange 36 in the radial direction and also serve as additional cooling oil openings. In the exemplary embodiment, the cooling oil collector 35 is held in the region of the inner support element 25 of the lower piston part 12 under spring bias. Furthermore, in the exemplary embodiment, a concave, circumferential depression 39 having a depth of approximately 0.5 mm, in which depression the flange 36 is accommodated, is formed into the inner support element 25. Furthermore, in the exemplary embodiment, the cooling oil collector 35 is disposed in such a manner that its curvature is directed toward the upper piston part 11. Depending on the placement of the cooling oil collector 35 in the cavity 31, the curvature can also be directed toward the pin bosses 18.

Of course, the cooling oil collector 35 can also be disposed in the region of the inner support element 21 of the upper piston part 11. In this case, it is practical to form a concave, circumferential depression into the inner support element 21, in which the flange 36 of the cooling oil collector 35 is accommodated.

The cooling oil collector 35 serves to collect the cooling oil that passes through the cooling oil channels 33a, 33b, out of the outer cooling channel 29, into the cavity 31, and to guide it in the direction of the underside of the piston crown 13, particularly by means of the shaker effect that occurs during operation, in order to increase the cooling effect in this region. The cooling oil openings 37, 38 make it possible to guide a defined amount of cooling oil in the direction of the piston pin (not shown) accommodated in the pin bores 19, in order to improve its lubrication.

Furthermore, after prior cleaning and degreasing of the surfaces, the flange region 36 of the cooling oil collector 35 can be provided with a layer of solder tin, for example a copper/tin solder or silver solder (AgSn), applied in a layer thickness of 100-500 μm, using dabber printing or screen printing, or by means of immersion in a solder bath.

For assembly of the piston 10 according to the invention, first the upper piston part 11, the lower piston part 12, and the cooling oil collector 35 are produced as separate components. In the exemplary embodiment, a concave, circumferential depression 39 having a depth of about 0.5 mm is formed into the inner circumferential support element 25 of the lower piston part 12, for example cut in by means of machining. In the exemplary embodiment, the cooling oil collector 35 is inserted into the lower piston part 12 in the region of the inner circumferential support element 25, and held under spring bias there, with force fit, whereby the circumferential flange 36 engages into the circumferential depression 39. Subsequently, the upper piston part 11 and the lower piston part 12 are connected with one another by way of the joining surfaces 23, 27 and 24, 28, respectively, by means of a joining method that can be selected as desired, in such a manner that the cooling oil collector 35 is accommodated in the finished piston in the cavity 31.

FIGS. 3 and 4 show another exemplary embodiment of a piston 10' according to the invention, which corresponds almost completely to the piston 10 according to FIGS. 1 and 2, in terms of its structure, so that the reference symbols are kept the same, for reasons of simplicity.

The significant difference as compared with the piston 10 according to FIGS. 1 and 2 consists in that in the case of the piston 10', the cooling oil collector 35 is now disposed in the region of the inner support element 21 of the upper piston part 11. For this reason, a concave, circumferential depression 39 is also formed into the inner support element 21 in this exemplary embodiment, in which depression the flange 36 of the cooling oil collector 35 is accommodated.

In this configuration, it is furthermore practical if, as shown in FIGS. 3 and 4, cooling channels 33 are only disposed exclusively in the inner support element 21 of the upper piston part 11, above the cooling oil collector 35. In the exemplary embodiment, the cooling oil channels 33 run at an angle, upward, proceeding from the outer cooling channel 29, in the direction of the cavity 31.

The upper piston part 11 and the lower piston part 12 of the piston 10' according to FIGS. 3 and 4 can be connected with one another by means of any desired joining method, particularly by means of a welding method, for example a friction welding method.

Once the flange region of the cooling oil collector 35 has been provided with solder paste, melting of the solder layer takes place by means of the heat that results from the friction welding process, so that additional fixation of the cooling oil collector on the piston part takes place.

The inner cooling chamber having the cooling chamber bottom in the form of a wide, radially circumferential ring land, which is necessary in the state of the art, has therefore been eliminated.

The invention claimed is:

1. A multi-part piston for an internal combustion engine, comprising:
    an upper piston part having a piston crown, a first inner support element, and a first outer support element; and a lower piston part having a piston skirt, a second inner support element, a second outer support element, pin boss supports and pin bosses connected with said pin boss supports,
    wherein said first and second inner support elements and first and second outer support elements delimit an outer circumferential cooling channel,
    wherein said first and second inner support elements delimit a cavity that is open toward the pin bosses,
    wherein said cavity is provided with a separate cooling oil collector, said separate cooling oil collector having at least one cooling opening, and
    wherein the cooling oil collector has an at least partially circumferential spring-elastic flange.

2. The piston according to claim 1, wherein the cooling oil collector is held on the first inner support element or on the second inner support element.

3. The piston according to claim 2, wherein a concave, and at least partially circumferential depression for accommodating at least an edge region of the cooling oil collector is provided on at least one of the first inner support element and the second inner support element.

4. The piston according to claim 1, wherein the cooling oil collector is held under spring bias.

5. The piston according to claim 1, wherein the cooling oil collector has at least two elastic spring tongues disposed on the outer edge.

6. The piston according to claim 1, wherein the flange region of the cooling oil collector has a layer of solder tin.

7. The piston according to claim 1, wherein the cooling oil collector is configured to be essentially round.

8. The piston according to claim 1, wherein the cooling oil collector has a slight curvature.

9. The piston according to claim 1, wherein the at least one cooling oil opening in the cooling oil collector is configured as a slit disposed at the edge of the cooling oil collector.

10. The piston according to claim 1, wherein the cooling oil collector has two or more cooling oil openings.

11. The piston according to claim 1, wherein the cooling oil collector is produced from a spring steel sheet.

12. A method for the production of a multi-part piston for an internal combustion engine, comprising the following method steps:
    producing an upper piston part having a piston crown as well as an inner and an outer support element,
    producing a lower piston part having a skirt and having pin boss supports and pin bosses connected with said pin boss supports, as well as having an inner and an outer support element,
    inserting a separate cooling oil collector, having at least one cooling oil opening, into the upper piston part or the lower piston part,
    connecting the upper piston part and the lower piston part in such a manner that each of the inner and outer support elements delimit an outer circumferential cooling channel and a cavity that is open toward the pin bosses and provided with the cooling oil collector,
    wherein the flange region of the cooling oil collector is provided with a layer of solder tin.

13. The method according to claim 12, wherein the cooling oil collector is inserted into the upper piston part, in a region of the inner support element, or into the lower piston part, in a region of the inner support element.

14. The method according to claim 12, wherein a concave, and at least partially circumferential depression is made in at least one of the inner support element of the upper piston part and in the inner support element of the lower piston part, and wherein the cooling oil collector is inserted in such a manner that at least an edge region of the cooling oil collector is accommodated in the depression.

15. The method according to claim 12, wherein the cooling oil collector is soldered to the upper or lower piston part, by means of the friction heat that occurs during friction welding.

* * * * *